(12) United States Patent
Vachal

(10) Patent No.: US 7,958,943 B2
(45) Date of Patent: Jun. 14, 2011

(54) WHEEL MOUNTING/HEIGHT ADJUSTMENT MECHANISM FOR A POWER EQUIPMENT UNIT

(75) Inventor: Tommy Joe Vachal, Lincoln, NE (US)

(73) Assignee: Exmark Manufacturing Company, Incorporated, Beatrice, NE (US)

( * ) Notice: Subject to any disclaimer, the term of this patent is extended or adjusted under 35 U.S.C. 154(b) by 0 days.

(21) Appl. No.: 12/571,790

(22) Filed: Oct. 1, 2009

(65) Prior Publication Data

US 2011/0078990 A1   Apr. 7, 2011

(51) Int. Cl.
*A01B 69/00* (2006.01)
(52) U.S. Cl. .......................................... 172/259; 56/17.2
(58) Field of Classification Search ................. 56/17.2, 56/320.1; 280/43, 43.17, 11.232, 11.27; 172/259, 337
See application file for complete search history.

(56) References Cited

U.S. PATENT DOCUMENTS

| | | | | |
|---|---|---|---|---|
| 2,818,270 A | * | 12/1957 | Cataline | 280/43.17 |
| 2,836,430 A | * | 5/1958 | Langenbacher | 280/43 |
| 2,882,063 A | | 4/1959 | Strasel | |
| 2,915,318 A | | 12/1959 | Chesser | |
| 3,038,736 A | | 6/1962 | Root | |
| 3,043,604 A | * | 7/1962 | Rehnberg et al. | 280/43 |
| 3,147,987 A | * | 9/1964 | Ritums | 56/255 |
| 3,161,006 A | | 12/1964 | Willette et al. | |
| 3,210,089 A | * | 10/1965 | Hoffman et al. | 280/43 |
| 3,292,351 A | * | 12/1966 | Larson et al. | 56/17.2 |
| 3,421,776 A | | 1/1969 | McCoy et al. | |
| 3,649,828 A | | 3/1972 | Price | |
| 3,927,513 A | * | 12/1975 | Ramaker et al. | 56/320.1 |
| 4,172,351 A | * | 10/1979 | Scanland | 56/320.1 |
| 4,220,344 A | | 9/1980 | Kappel | |
| 4,224,785 A | * | 9/1980 | Hoch | 56/17.4 |
| 4,248,034 A | * | 2/1981 | Jackson et al. | 56/17.2 |
| 4,280,319 A | * | 7/1981 | Scanland | 56/255 |
| 4,321,784 A | | 3/1982 | Wood et al. | |
| 4,321,785 A | * | 3/1982 | Kaland | 56/17.2 |
| 4,525,989 A | * | 7/1985 | Lane et al. | 56/17.4 |
| 4,738,316 A | * | 4/1988 | Wood | 172/603 |
| 4,899,524 A | | 2/1990 | Eilles | |
| 5,251,429 A | | 10/1993 | Minato et al. | |
| 5,259,175 A | | 11/1993 | Schmidt | |
| 5,526,633 A | * | 6/1996 | Strong et al. | 56/17.2 |

(Continued)

OTHER PUBLICATIONS

"Parts Manual—21" Self-propelled Mowers with Serial #20,000 or Higher" (Form No. 8839). Exmark Mfg. Co., Inc., 2 pages; 1987.
"Parts Manual—21" Push Mowers with Serial #20,000 or Higher" (Form No. 8827). Exmark Mfg. Co., Inc., 2 pages; 1987.

(Continued)

*Primary Examiner* — Árpád Fábián-Kovács
(74) *Attorney, Agent, or Firm* — Mueting, Raasch & Gebhardt, P.A.

(57) ABSTRACT

A wheel mounting and height adjustment mechanism for use with a power equipment unit/implement such as a lawn mower. In one embodiment, the mechanism may include a block defining a plurality of bores, each bore to selectively receive an axle of a wheel assembly. A plate member may be provided in or near the block. The plate member may include a plurality of elongate cutouts such that a separate cutout is selectively alignable with each of the plurality of bores. When the plate member is in a disengaged position such that a first portion of each cutout is aligned with its respective bore, each cutout permits the axle to fully enter its respective bore. However, when the plate member is moved to an engaged position, each cutout may engage the axle to capture the respective wheel assembly.

20 Claims, 7 Drawing Sheets

U.S. PATENT DOCUMENTS

| | | | | |
|---|---|---|---|---|
| 5,749,209 A | * | 5/1998 | Thomason | 56/17.2 |
| 5,845,471 A | * | 12/1998 | Seegert et al. | 56/17.2 |
| 6,041,584 A | | 3/2000 | Hohnl | |
| 6,899,345 B1 | * | 5/2005 | Bearden | 280/43 |

OTHER PUBLICATIONS

"Operator's Manual for 21" Mowers" (Form No. 8849). Exmark Mfg. Co., Inc., 6 pages; 1988.

* cited by examiner

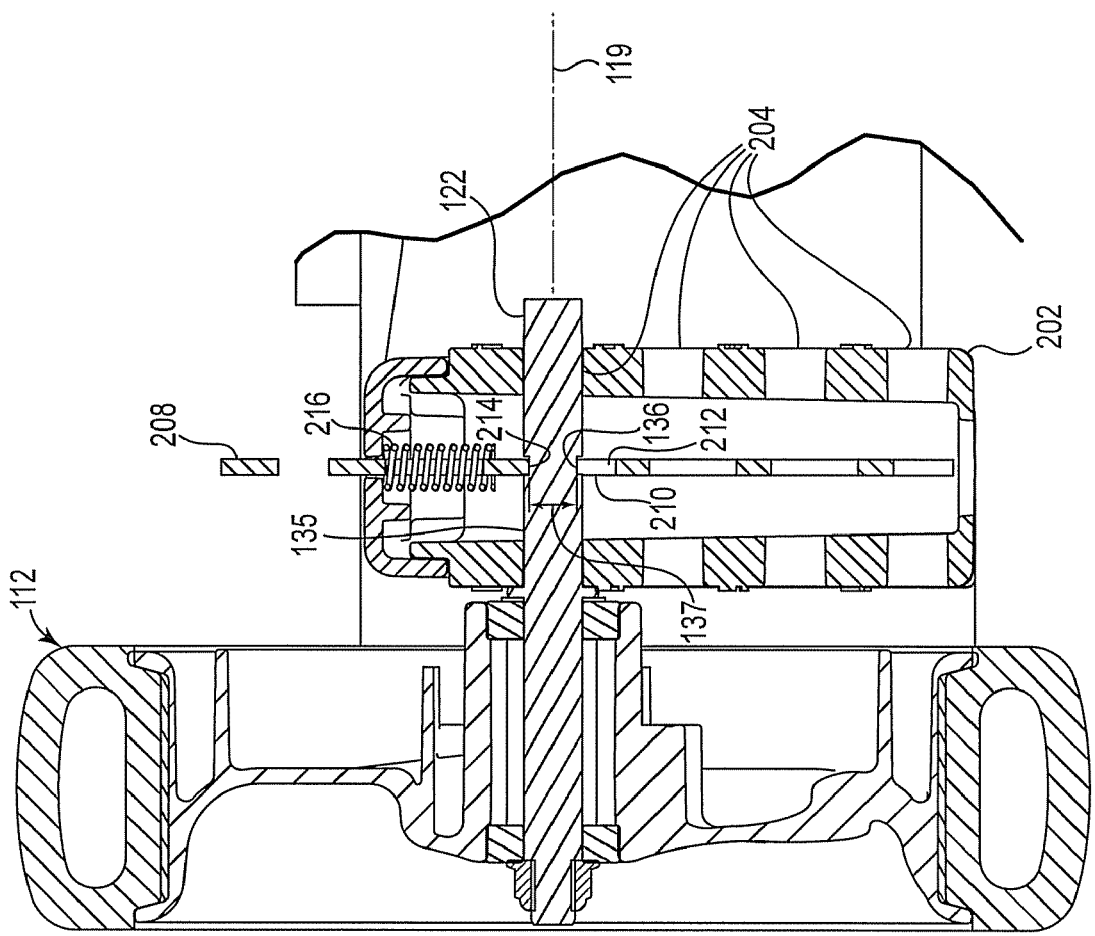

WHEEL MOUNTING/HEIGHT ADJUSTMENT MECHANISM FOR A POWER EQUIPMENT UNIT

TECHNICAL FIELD

The present invention relates generally to power equipment units and, more particularly, to a wheel mounting and height adjustment mechanism for setting an operative height of the unit (or an attached implement such as a lawn mower cutting deck) relative to a surface.

BACKGROUND

Power lawn mowers typically incorporate a system for adjusting the height of cut of the lawn mower blade. For example, a conventional walk-behind, rotary power mower may include (among other components) a housing or deck, wheels that support the deck relative to a ground surface, a handlebar assembly for operator control of the mower, and a powered cutting blade. To control the height of cut, a height adjustment mechanism may be provided. The height adjustment mechanism generally provides a method of vertically raising and lowering the wheels relative to the deck to correspondingly raise and lower the cutting blade relative to the ground surface.

The height adjustment mechanism is typically located between the mower deck and one or more of the mower wheels. Typically, the mechanism includes a lever that is movable (e.g., pivotable) in a fore and aft direction between various detent positions, wherein the detent positions represent different height settings for the mower blade. The wheel may be bolted to a portion of the lever such that movement of the lever to different detent positions may raise or lower the respective wheel relative to the deck, effectively raising or lowering the mower blade. In general, height adjustment mechanisms allow the operator to choose one of several different height settings that will best suit a particular mowing requirement.

While such detent lever mechanisms are more than satisfactory for their intended purpose, such mechanisms may include numerous parts, potentially adding to the cost and complexity of the mower. Moreover, as stated above, the wheel is typically bolted directly to the detent lever. As a result, wheel removal, e.g., for replacement and/or maintenance, often requires various tools. Still further, in high use environments (e.g., landscape contracting) where the mower is operated for extended periods and/or the height adjustment mechanism is manipulated frequently, some components of the detent mechanism may wear prematurely, resulting in a perceived lack of durability of the mower.

SUMMARY

The present invention may overcome these and other issues by providing, in one embodiment, a ground working implement including a housing and a wheel assembly for supporting the housing in rolling engagement with a ground surface. The wheel assembly includes a wheel and a wheel axle, wherein the axle extends outwardly from, and defines a rotational axis of, the wheel. A wheel mounting block associated with the housing is also provided, the block defining a plurality of bores vertically spaced-apart from one another. Each bore is configured to selectively receive the wheel axle to place the wheel assembly at a corresponding plurality of vertical locations relative to the housing, the block further defining a passageway extending through the block and intersecting each of the plurality of bores. Also included is a plate positively retained within the passageway. The plate defines a plurality of elongate cutouts formed through the plate such that an elongate cutout is positioned adjacent each bore of the plurality of bores. The plate is translatable within the passageway between a disengaged position, where each cutout is selectively positioned relative to its respective bore to allow longitudinal movement of the axle within the bore, and an engaged position, where a portion of the plate surrounding each cutout is selectively positioned to engage the axle to prevent longitudinal movement of the axle relative to the respective bore.

In another embodiment, a walk-behind lawn mower is provided and includes a housing having two front corners. A wheel assembly is positioned near each front corner of the housing to support the housing in rolling engagement with a ground surface. Each wheel assembly has a wheel and a wheel axle attached to the wheel, wherein the axle extends outwardly from, and defines a rotational axis of, the wheel. The axle further includes an outer shaft surface defining a circumferential groove recessed therein. A wheel mounting block attached to each front corner of the housing is also provided. Each block defines a plurality of bores vertically spaced-apart from one another, each bore configured to selectively receive the wheel axle to place the associated wheel assembly at a corresponding plurality of vertical locations relative to the housing. The block further defines a vertical passageway extending through the block and intersecting each of the plurality of bores. A biased and movable plate is also provided and operatively retained within the vertical passageway between the housing and the mounting block. The plate defines a plurality of elongate cutouts foamed through the plate such that an elongate cutout is positioned adjacent each of the plurality of bores, each cutout defined by a first end and a second end. The first end forms a semicircular shape of a diameter greater than a diameter of the outer shaft surface of the axle. The second end forms a semicircular shape of a diameter less than the diameter of the outer shaft surface.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein:

FIG. 7 is a section view taken along line 7-7 of FIG. 6.

Figure 1:
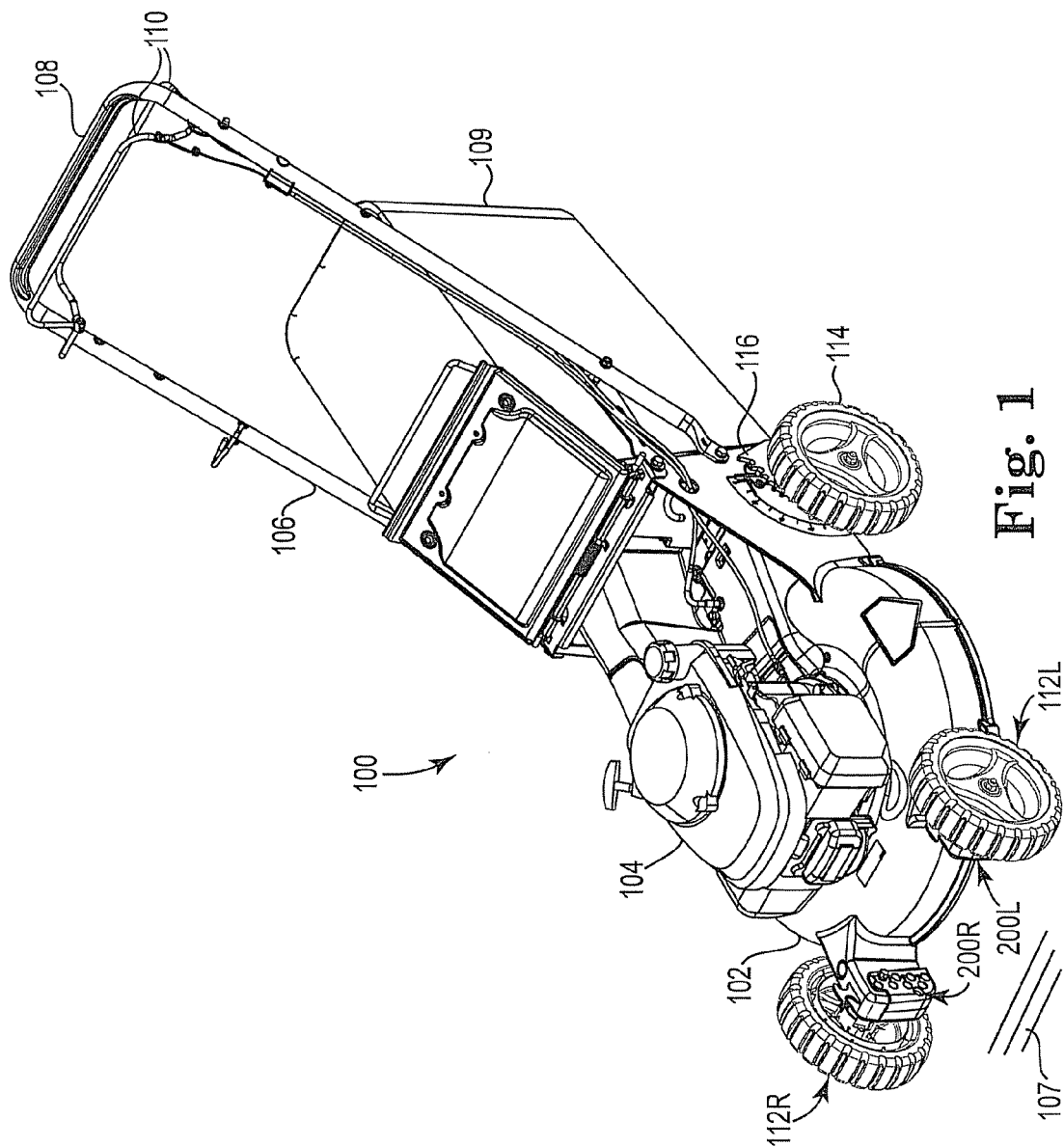
FIG. 1 illustrates a power equipment unit, e.g., a walk-behind rotary lawn mower, incorporating a deck housing with a wheel mounting and height adjustment mechanism in accordance with one embodiment of the invention.

The figures are rendered primarily for clarity and, as a result, are not necessarily drawn to scale.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

Generally speaking, embodiments of the instant invention are directed to power equipment units, especially those incorporating ground working implements, and to apparatus and methods for mounting a wheel (or other support member) to the same. Apparatus and methods in accordance with embodiments of the present invention may further penult adjusting the vertical position of the wheel relative to the unit. As a result, the wheel may be raised or lowered as desired (e.g., to change the height of cut when applied to a lawn mowing implement).

Embodiments of the present invention are described herein in the context of a rotary, walk-behind lawn mower as shown in FIG. 1. However, those of skill in the art will appreciate that other embodiments of the present invention could find application to most any power equipment unit/implement (e.g., dethatchers, edgers, aerators, cutting decks for riding mowers, etc,) or most any other vehicle without departing from the scope of the invention.

Relative terms such as "left," "right," "fore," "forward," "aft," "rearward," "top," "bottom," "upper," "lower," "horizontal," "vertical," and the like are, if used herein, from the perspective of one operating the mower 100 while the mower is in an operating configuration, e.g., while the mower 100 is positioned such that the wheels 112, 114 rest upon a generally horizontal ground surface 107 as shown in FIG. 1. These terms are used herein only to simplify the description, however, and not to limit the scope of the invention in any way.

Similarly, the suffixes "R" and "L" may be used throughout this description to denote various right and left side parts/features, respectively. However, unless otherwise noted, identically numbered parts/features distinguished with "R" and "L" suffixes are substantially identical to, or mirror images of, one another. It is understood that, unless otherwise noted, the description of an individual part/feature (e.g., the description of a part/feature identified with an "L" suffix) also applies to the opposing part/feature (e.g., the part/feature identified with an "R" suffix). Similarly, the description of a part/feature identified with no suffix is intended to apply to both the corresponding left and right part/feature (e.g., to both the part/feature identified with the "L" suffix and the "R" suffix).

FIG. 1 illustrates a walk-behind power equipment unit/ground working implement, e.g., a rotary lawn mower 100, in accordance with one embodiment of the present invention. As shown in this view, the mower 100 may include a deck or housing 102 and a prime mover (e.g., internal combustion engine 104 or electric motor) attached to the housing. A handle assembly 106 may also be included. The handle assembly 106 may extend upwardly and rearwardly from the housing 102 as shown. The handle assembly 106 may, in one embodiment, be generally U-shaped to form a hand grip portion 108 operable to receive hands of an operator during operation of the mower 100. The handle assembly 106 may further include various operator controls 110 such as blade and/or drive control bales and operator presence controls.

The power equipment unit, e.g., mower 100, may further include one or more ground engaging members such as front wheel assemblies 112 (one positioned near each front corner of the housing 102) and rear wheel assemblies 114 (only one rear wheel assembly visible in FIG. 1) to allow rolling engagement of the housing 102 over the ground surface 107. The housing 102 may define a downwardly facing cutting chamber in which a rotatable cutting blade (not shown) is located. When the mower 100 passes over the ground surface 107, the cutting blade may sever grass or other vegetation at a pre-determined height as is known in the art. The engine 104 may provide the necessary rotational power to the culling blade and may optionally provide driving power to one or more of the wheels (e.g., to both rear wheels assemblies 114) via a transmission (not shown). A removable bag 109 may be provided to permit the collection of cut grass clippings when the mower is configured in a bagging mode.

In the illustrated embodiment, both rear wheel assemblies 114 may be raised and lowered (relative to the housing 102) via a single adjustment lever 116 to effectively raise or lower the rear of the housing 102. However, each front wheel assembly 112 may be independently raised and lowered utilizing a wheel mounting and height adjustment ("MHA") structure including a mechanism 200 (e.g., mechanism 200R and 200L) in accordance with one embodiment of the invention. FIGS. 2-7 illustrate an exemplary MBA mechanism 200 (one positioned near each front wheel) in accordance with one embodiment of the invention.

Figure 2:
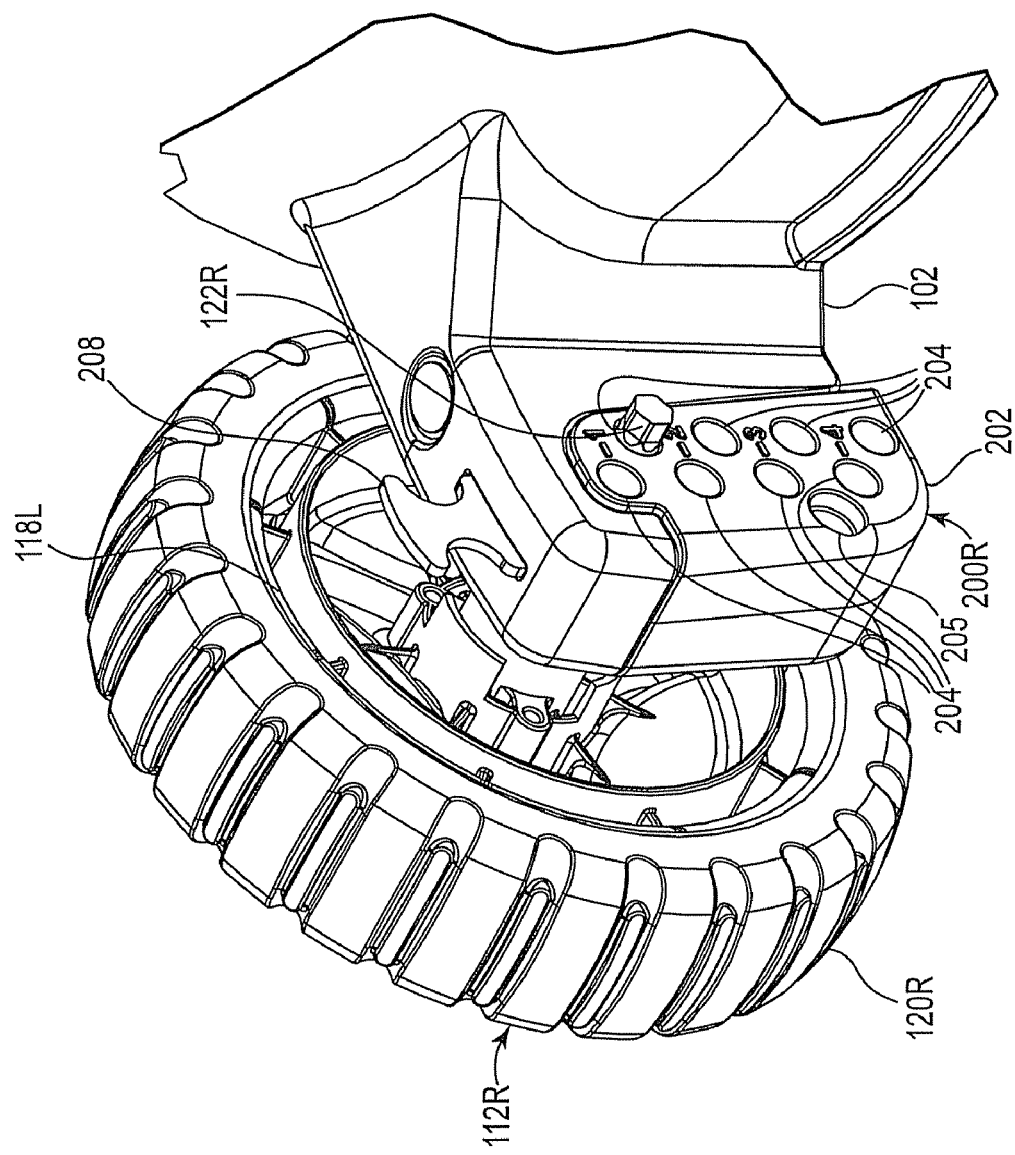
FIG. 2 is an enlarged perspective view of a portion of the mower of FIG. 1 illustrating an inner side of a right front wheel mounting and height adjustment mechanism with its respective wheel assembly attached.
Figure 3:
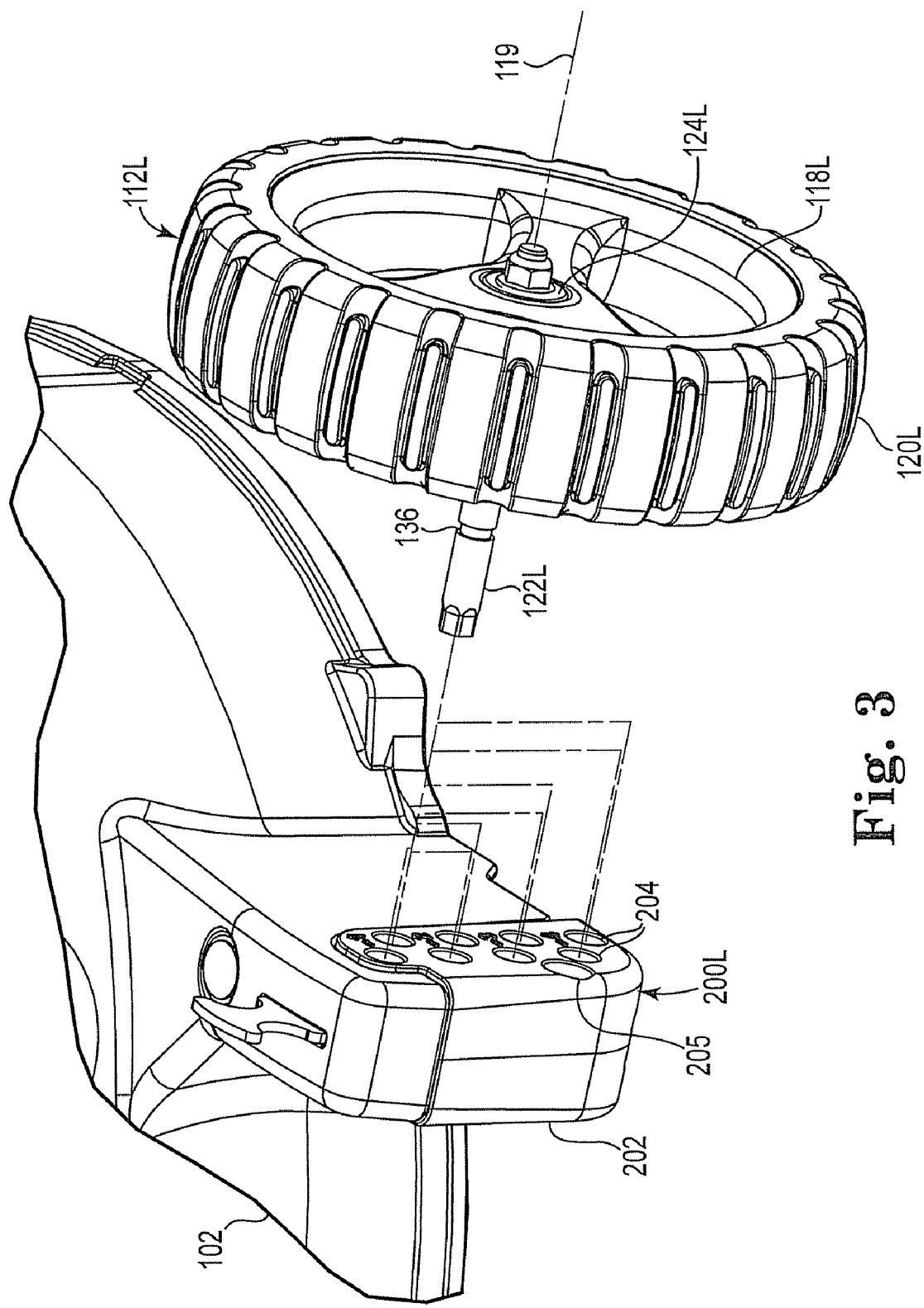
FIG. 3 is an enlarged perspective view of another portion of the mower of FIG. 1 illustrating an outer side of a left front wheel mounting and height adjustment mechanism with its respective wheel assembly detached.

FIG. 2 is an enlarged view of an inner side of the MHA mechanism 200R (shown in FIG. 1) with the front wheel assembly 112R shown at an intermediate height setting. FIG. 3, on the other hand, is an enlarged view of an outer side of the MHA mechanism 200L with its associated front wheel assembly 112L detached. As shown in these views, each front wheel assembly 112 may include a wheel 118 (e.g., which may include an outer tire 120), a wheel axle 122, and various other hardware (e.g., bearings 124) as described in more detail below. The wheel axle 122 may extend outwardly from, e.g., from the center of, the wheel 118 and define a rotational axis 119 of the wheel. In one embodiment, the axle is made from hardened steel.

Each MHA mechanism 200 may also include a secondary structure, e.g., wheel mounting block 202, associated with the housing 102 proximate each of the front wheel assemblies 112 (e.g., integral with or attached near each front corner of the housing). Each block 202 may define a plurality of bores 204 that are each vertically spaced-apart from one another. Each bore 204 may be configured to selectively receive the wheel axle 122. As a result, each wheel assembly 112 may be placed at a corresponding plurality of vertical locations relative to the housing 102. That is, the height of each wheel assembly 112, relative to the housing 102, may be altered by placing the axle 122 of the respective wheel assembly 112 into the desired bore 204 of the block 202. In the illustrated embodiment, the density of the bores 204 is increased by arranging the bores in two or more horizontally offset rows such that one bore may be both horizontally and vertically offset from another (see, e.g., FIG. 2). Each block 202 may also include an opening 205 configured to receive an optional front bumper rod (not shown) therein.

Each block 202 may be made of a material that is capable of withstanding the bearing loads exerted on the block by the wheel axle 122 during normal mower operation. For example, the block 202 could be constructed of steel or aluminum. Alternatively, the block may be made from a polymeric material such as nylon or polyoxymethylene (sold under the trade name Delrin by E. I. du Pont de Nemours and Company of Wilmington, Del., USA).

Figure 4:
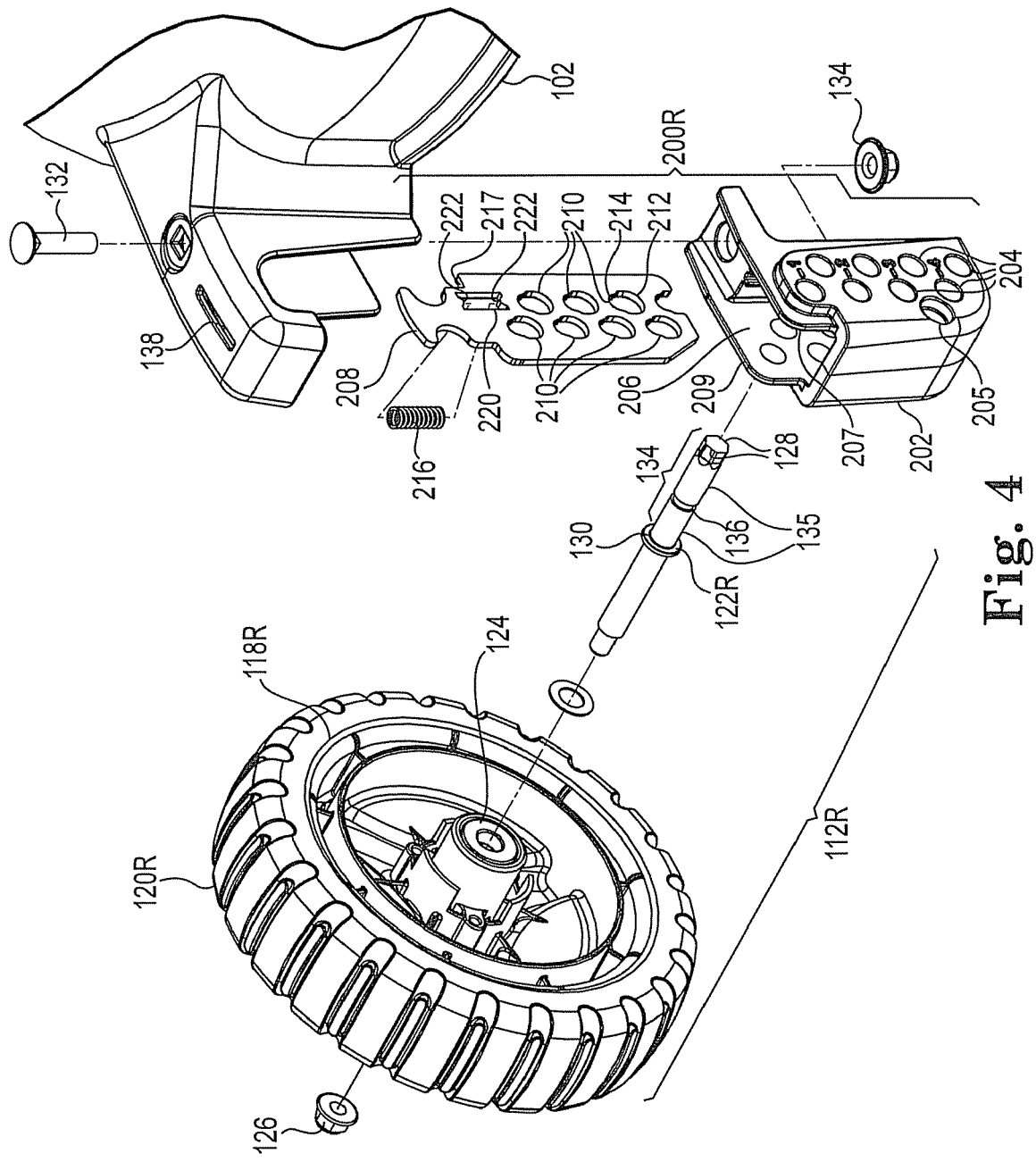
FIG. 4 is an exploded perspective view of the wheel mounting and height adjustment mechanism of FIG. 2 and its related surrounding structure.

FIG. 4 illustrates the housing 102, MHA mechanism 200R, and wheel assembly 112R in an exploded view. As illustrated in this view, the axle 122 (as well as other wheel assembly components such as bearings 124) may be held in place with a nut 126 threaded onto an outer end of the axle. The axle 122 may include flats 128 to assist with tightening the nut 126 relative to the axle. To locate the axle relative to the wheel assembly 112, the axle 122 may also include a shoulder 130 that abuts the wheel assembly (e.g., the inner bearing 124). The axle may further define an engagement portion 134 formed by a cylindrical outer shaft surface 135 that is receivable within any one of the bores 204 as further described below. A circumferential groove 136 may be recessed within the engagement portion of the axle 122 (e.g., along the outer shaft surface) as shown in FIG. 4. An inner surface of the groove 136 may define a root diameter 137 (see e.g., FIG. 7) that is less than the diameter of the engagement portion 134 of the axle 122.

The block 202 of the MHA mechanism 200 may further define an opening or passageway 206 (see FIG. 4) that extends, e.g., vertically, through the block in a direction orthogonal to an axis of, and intersecting, each of the plurality of bores 204. As shown in FIG. 4, the exemplary mounting block 202 thus includes inner and outer walls 207 and 209, respectively, wherein each bore 204 of the plurality of bores extends through both inner and outer walls (e.g., completely through the block), and wherein the passageway 206 is located between the inner and outer walls.

Each MHA mechanism 200 may further include a member or plate (e.g., lock plate 208) that fits into the passageway 206 and is, in one embodiment, positively retained therein between the housing 102 and the mounting block 202. The plate 208 may be defined by multiple elongate cutouts such that a separate elongate cutout 210 is configured to be positioned adjacent each bore 204. In the illustrated embodiment, the plate 208 is defined by two offset planar faces, wherein each elongate cutout passes completely through both of the faces of the plate.

Each elongate cutout 210 may have a first (e.g., lower) end 212 and a second (e.g., upper) end 214. The first end 212 may be defined by an opening having a diametral dimension of a size greater than a diameter of the outer shaft surface 135 (when the first end 212 is aligned with its respective bore). However, the second end 214 may be defined by an opening having a diametral dimension less than the diameter of the outer shaft surface 135. For example, the diametral dimension of the second end 214 may be less than the diameter of the outer shaft surface, but equal to or greater than the root diameter 137 (see FIG. 7) of the circumferential groove 136 (when the second end 214 is aligned with its respective bore). The plate 208 may be movable, e.g., linearly translatable, between a disengaged position, wherein the first end 212 of each elongate cutout 210 is aligned with its corresponding bore 204, and an engaged position, wherein the second end 214 of each elongate cutout is aligned with its corresponding bore.

Figure 5:
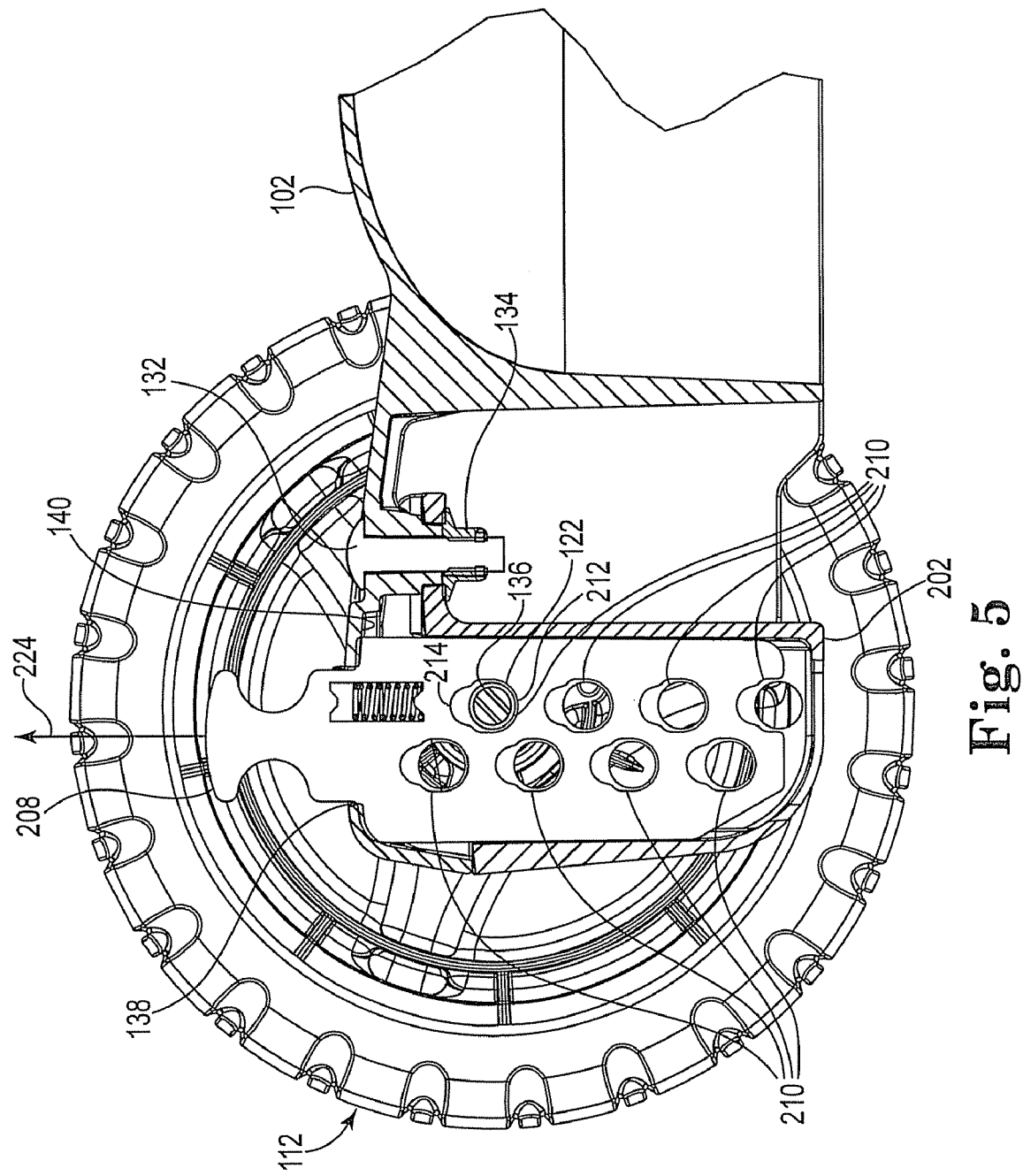
FIG. 5 is a cross sectional view of the wheel mounting and height adjustment mechanism of FIG. 2 with an engagement plate shown in a disengaged position.

In one embodiment, the desired cutout 210 construction may be achieved by utilizing a plate 208 having cutouts that each define two intersecting and overlapping bores of different sizes (see, e.g., FIGS. 4 and 5). For example, the first end 212 of each cutout 210 may be defined by a semicircular shape of a diameter greater than the outer diameter of the outer shaft surface 135 of the engagement portion 134 of the axle, while the second end 214 of each cutout may be defined by a semicircular shape of a diameter less than the outer diameter of the outer shaft surface, but equal to or larger than the root diameter 137 of the groove 136. While such a specific cutout configuration is disclosed, other shapes that provide the desired tapered shape, e.g., a teardrop-shaped cutout, are certainly possible.

In the embodiment illustrated herein, the block 202 of the MBA mechanism is secured, e.g., fastened, to the housing 102 of the mower with a single fastener 132 and nut 134 (see, e.g., FIGS. 4 and 5). However, embodiments wherein the block 202 is otherwise attached (e.g., made integral with the housing 102 or attaching via different means such as snap fit engagement with the housing) are also contemplated.

As shown in FIG. 4, the housing 102 of the mower may include a mounting block attachment portion defining a plate slot 138 in communication with the passageway 206. When assembled, the plate 208 may extend upwardly through the plate slot 138 as shown in the figures (see, e.g., FIG. 5). The plate 208 may include features, e.g., shoulders 217, that contact stop surfaces 140 of the mounting block attachment portion to limit movement of the plate 208 within the passageway 206 (to prevent the plate from passing upwardly and out of the mower). Similarly, the shape of the block 202 may interfere with passing of the plate 208 out of the bottom of the mower. As a result, movement of the plate 208 may be confined by the mower, e.g., by the housing 102 and the block 202 of the MHA mechanism 200.

The MHA mechanism 200 may further include a biasing member. As further explained below, the biasing member may be used to bias the plate 208 towards the engaged position, e.g., a position where it may engage the axle 122 to restrain longitudinal movement of the axle relative to the bore 204. The biasing member 216 may be configured in any number of ways. For instance, in the illustrated embodiment, it is configured as a compression spring that may be retained within a window 220 (see, e.g., FIG. 4) formed in the plate 208. During assembly, the spring may be compressed until it fits within the window 220. When released, tabs 222 formed at the ends of the window may retain the spring in its desired location.

To assemble the MHA mechanism 200 with the housing 102, the spring 216 may be located within the window 220 of the plate 208 and the plate positioned within the passageway 206 (inserted from above in FIG. 4) of the block 202. The block 202 may then be positioned near the housing 102 of the mower such that the upper end of the plate 208 protrudes upwardly through the plate slot 138 formed in the housing. As the block 202 is positioned, the spring 216 may come into contact with a lower side (e.g., the stop surfaces 140) of the housing 102 (see, e.g., FIGS. 5 and 6). The fastener 132 and nut 134 (or alternative attachment feature) may then be used to secure the block in place. As the fastener 132 is tightened, the spring 216 may compress slightly, thereby creating a downward biasing force to the plate 208.

The operation of the mechanism 200 will now be described, primarily with reference to FIGS. 5-7. As illustrated in FIG. 5, the wheel assembly 112 may be coupled to the housing 102 by inserting the axle 122 through one of the bores 204 (e.g., the second bore from the top in the Figures). To permit insertion of the axle 122, the operator may grasp the protruding portion of the plate 208 and pull upwardly against the biasing force of the spring 216 (pull in the direction 224 as shown in FIG. 5). Such action causes the plate to move from its engaged position (see FIG. 6), towards which it is normally biased, to its disengaged position (see FIG. 5). In the disengaged position, each cutout 210 is selectively positioned relative to its respective bore 204 to allow longitudinal movement of the axle 122 within the bore. However, when in the engaged position, an edge or portion of the plate surrounding each cutout 210 is selectively positioned to mechanically engage the axle (e.g., engage the circumferential groove 136) to prevent longitudinal movement of the axle relative to the respective bore. In the illustrated embodiment, the first end 212 of each cutout 210 is aligned with its respective bore when the plate is in the disengaged position (See FIG. 5), while the second end 214 of each cutout is aligned with its respective bore, e.g., the second end is engaged with the groove 136 of the axle, when the plate is in the engaged position (see FIG. 6).

While not illustrated herein, the axle 122 could be restrained within the block 202 to prevent relative rotation. For example, the axle 122 could incorporate one or more flats, e.g., a D- or double D-cross section, and each bore 204 could include corresponding flat surfaces. Alternatively, the root diameter 137 of the groove 136 (see FIG. 7) could be eccentric relative to the shaft surface 135. The latter construction may, in combination with the biasing force applied by the plate 208, be sufficient to prevent axle rotation within the block 202.

Figure 6:
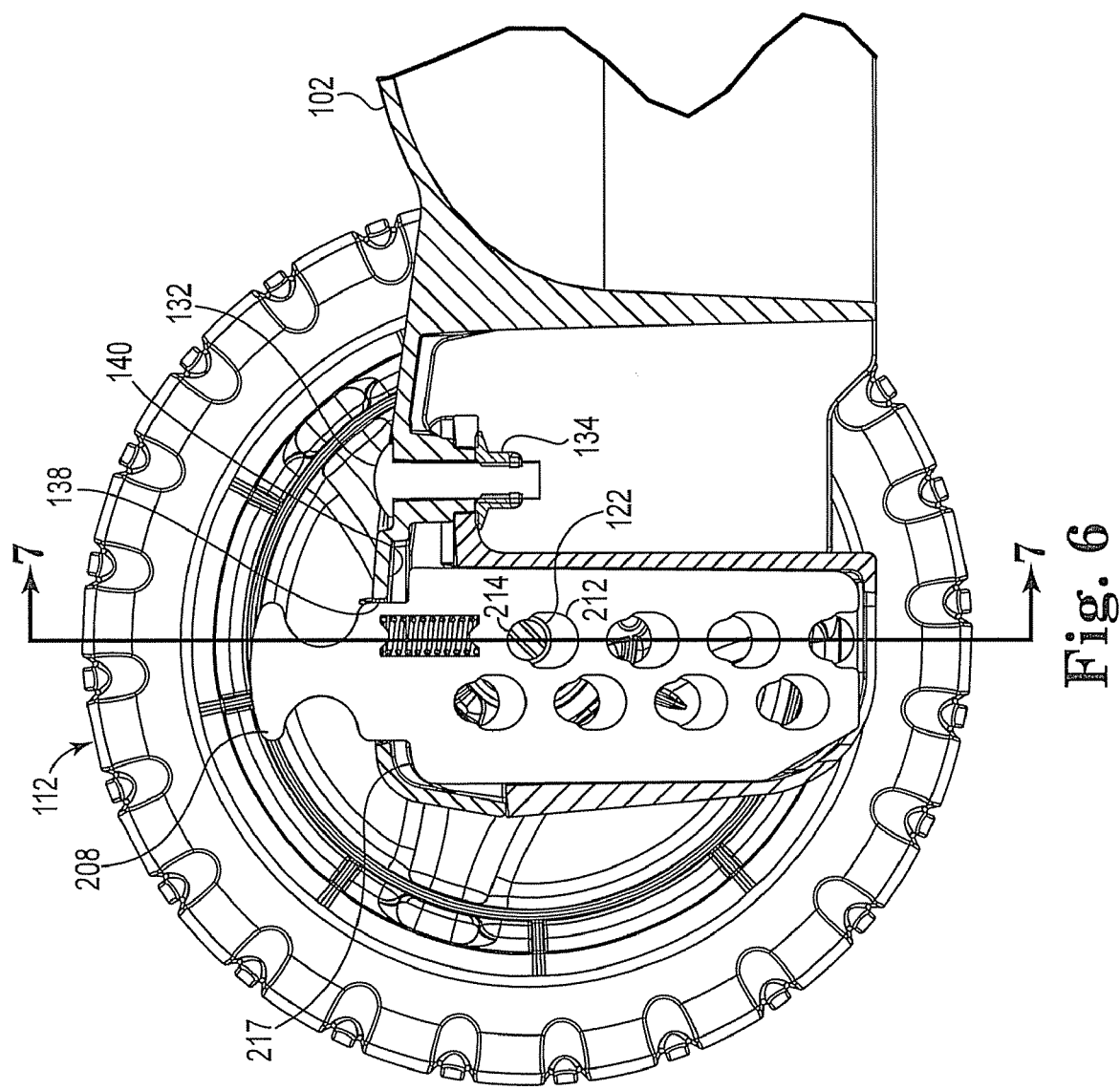
FIG. 6 is a cross sectional view similar to that of FIG. 5, but with the engagement plate shown in an engaged position.

FIG. 7 illustrates another cross sectional view of the MHA mechanism 200 taken along line 7-7 of FIG. 6. The engagement of the plate 208 with the groove 136 of the axle 122 is clearly shown in this view.

To reposition the wheel assembly 112 to a different height position, the plate 208 may be displaced from the engaged position (shown in FIGS. 6 and 7) to the disengaged position (as shown in FIG. 5). Once again, this may be accomplished by grasping the plate 208 and pulling upwardly, e.g., in the direction 224 (see FIG. 5).

As the plate 208 is pulled upwardly, the second end 214 of the cutout 210 disengages from the axle 122 and the first end 212 of each cutout comes into alignment with its respective bore 204. Accordingly, the axle 122 is free to slide out of the block 202.

The cutting height may be changed by then relocating the axle 122 to any other bore 204 that corresponds to the desired cutting height. Once fully inserted, the upward force on the plate 208 may be released. The biasing force of the spring 216 then causes the plate 208 to return to its engaged position (see, e.g., FIGS. 6 and 7), wherein the second end 214 of the respective cutout 210 again engages the groove 136 of the axle 122 and holds the wheel assembly 112 in place.

While the plate 208 is described with some particularity herein, other embodiments are certainly possible without departing from the scope of the invention. For example, the cutouts 210 could be inverted (e.g., the first end 212 and second end 214 switched) and the spring modified such that the plate is pushed downwardly to disengage the axle 122. Further, although shown and described in the context of a freewheeling front wheel assembly 112 of a mower, those of skill in the art will appreciate that embodiments of the present invention may also find application on other non-driven and driven wheels (e.g., the rear wheel assemblies 114) without departing from the scope of the invention.

Embodiments of the present invention may provide a wheel mounting and height adjustment mechanism that is not only durable, but simple and cost-effective to manufacture. Moreover, by utilizing a tool-less and captured mechanism, the wheel assembly may be moved to a different height position without the need for tools and without concern for lost or misplaced parts.

Illustrative embodiments of this invention are discussed and reference has been made to possible variations within the scope of this invention. These and other variations, combinations, and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A ground working implement comprising:
   a housing;
   a wheel assembly for supporting the housing in rolling engagement with a ground surface, the wheel assembly comprising a wheel and a wheel axle, wherein the axle extends outwardly from, and defines a rotational axis of, the wheel;
   a wheel mounting block associated with the housing, the block defining a plurality of bores vertically spaced-apart from one another and arranged in two or more horizontally offset rows, each bore configured to selectively receive the wheel axle to place the wheel assembly at a corresponding plurality of vertical locations relative to the housing, the block further defining a passageway extending through the block and intersecting each of the plurality of bores; and
   a plate positively retained within the passageway, the plate defining a plurality of elongate cutouts formed through the plate such that an elongate cutout is positioned adjacent each bore of the plurality of bores, wherein the plate is translatable within the passageway between a disengaged position, where each cutout is selectively positioned relative to its respective bore to allow longitudinal movement of the axle within the bore, and an engaged position, where a portion of the plate surrounding each cutout is selectively positioned to engage the axle to prevent longitudinal movement of the axle relative to the respective bore.

2. The implement of claim 1, wherein:
   the axle comprises an outer shaft surface defining a circumferential groove recessed therein; and
   each elongate cutout has a first end and a second end, the first end defined by an opening having a diametral dimension greater than a diameter of the outer shaft surface when the first end is aligned with its respective bore, and the second end defined by an opening having a diametral dimension less than the diameter of the outer shaft surface when the second end is aligned with its respective bore.

3. The implement of claim 2, wherein the plate, when in the disengaged position, aligns the first end of each elongate cutout with its corresponding bore and, when in the engaged position, aligns the second end of each elongate cutout with its corresponding bore.

4. The implement of claim 1, further comprising a biasing member configured to bias the plate towards the engaged position.

5. The implement of claim 1, wherein the mounting block comprises inner and outer walls, wherein each bore of the plurality of bores extends concentrically through both inner and outer walls, and wherein the passageway is located between the inner and outer walls.

6. A ground working implement comprising:
   a housing;
   a wheel assembly for supporting the housing in rolling engagement with a ground surface, the wheel assembly comprising a wheel and a wheel axle, wherein the axle extends outwardly from, and defines a rotational axis of, the wheel;
   a wheel mounting block attached to the housing, the block defining a plurality of bores vertically spaced-apart from one another, each bore configured to selectively receive the wheel axle to place the wheel assembly at a corresponding plurality of vertical locations relative to the housing, the block further defining a passageway extending through the block and intersecting each of the plurality of bores; and
   a plate positively retained within the passageway such that the plate protrudes upwardly through a plate slot formed in the housing, the plate defining a plurality of elongate cutouts formed through the plate such that an elongate cutout is positioned adjacent each bore of the plurality of bores, wherein the plate is translatable within the passageway between a disengaged position, where each cutout is selectively positioned relative to its respective bore to allow longitudinal movement of the axle within the bore, and an engaged position, where a portion of the plate surrounding each cutout is selectively positioned to engage the axle to prevent longitudinal movement of the axle relative to the respective bore.

7. A ground working implement comprising:
   a housing;
   a plurality of wheel assemblies configured to support the housing in rolling engagement with a ground surface, each wheel assembly comprising a wheel and a wheel axle, wherein each axle extends outwardly from, and defines a rotational axis of, its respective wheel, at least one axle further comprising a cylindrical outer shaft surface defining a circumferential groove recessed therein;
   a wheel mounting structure associated with the housing and located proximate one or more of the plurality of wheel assemblies, the mounting structure defining a plurality of bores vertically spaced-apart from one another, each bore configured to selectively receive the wheel axle to place its respective wheel assembly at a corresponding plurality of vertical locations relative to the housing, wherein a first bore of the plurality of bores is both horizontally and vertically offset from a second bore of the plurality of bores, the mounting structure further defining a passageway passing through the mounting structure and intersecting each of the plurality of bores; and
   a plate positively retained within the passageway, the plate defining a plurality of elongate cutouts formed through the plate such that an elongate cutout is positioned adjacent each bore of the plurality of bores, wherein the plate is linearly translatable within the passageway between: a disengaged position, where each cutout is selectively positioned, relative to its respective bore, to allow longitudinal movement of the axle within the bore; and an engaged position, wherein a portion of the plate surrounding each cutout is configured to mechanically engage the axle to prevent longitudinal movement of the axle relative to the bore.

8. The implement of claim 7, wherein the portion of the plate surrounding each cutout is configured to engage the circumferential groove of the axle when the plate is in the engaged position.

9. The implement of claim 7, wherein each mounting structure comprises a mounting block attached to the housing.

10. The implement of claim 9, wherein the mounting block comprises a polymeric bearing material.

11. The implement of claim 7, wherein the housing defines a plate slot, in communication with the passageway, wherein a surface of the housing surrounding the plate slot forms a stop surface to limit movement of the plate within the passageway.

12. The implement of claim 7, further comprising a biasing member configured to bias the plate towards the engaged position.

13. The implement of claim 12, wherein the biasing member comprises a compression spring.

14. The implement of claim 7, wherein the plurality of bores is arranged in two or more horizontally offset rows.

15. The implement of claim 7, wherein each bore of the plurality of bores passes completely through the wheel mounting structure.

16. A walk-behind lawn mower comprising:
    a housing comprising two front corners;
    a wheel assembly positioned near each front corner of the housing to support the housing in rolling engagement with a ground surface, each wheel assembly comprising a wheel and a wheel axle attached to the wheel, wherein the axle extends outwardly from, and defines a rotational axis of, the wheel, the axle further comprising an outer shaft surface defining a circumferential groove recessed therein;
    a wheel mounting block attached to each front corner of the housing, each block defining a plurality of bores vertically spaced-apart from one another, each bore configured to selectively receive the wheel axle to place the associated wheel assembly at a corresponding plurality of vertical locations relative to the housing, the block further defining a vertical passageway extending through the block and intersecting each of the plurality of bores; and
    a biased and movable plate operatively retained within the vertical passageway between the housing and the mounting block, the plate defining a plurality of elongate cutouts formed through the plate such that an elongate cutout is positioned adjacent each of the plurality of bores, each cutout defined by a first end and a second end, the first end forming a semicircular shape of a diameter greater than a diameter of the outer shaft surface of the axle, and the second end forming a semicircular shape of a diameter less than the diameter of the outer shaft surface.

17. The lawn mower of claim 16, wherein the plate is configured to move between a disengaged position, wherein the first end of each elongate cutout is aligned with its corresponding bore, and an engaged position, wherein the second end of each elongate cutout is aligned with its corresponding bore.

18. The lawn mower of claim 16, wherein the plate is defined by two planar faces, each elongate cutout passing through both of the two planar faces.

19. The lawn mower of claim 16, wherein the plurality of bores located on each of the wheel mounting blocks is defined by bores that are arranged in two or more horizontally offset rows.

20. A ground working implement comprising:

a housing;

a wheel assembly for supporting the housing in rolling engagement with a ground surface, the wheel assembly comprising a wheel and a wheel axle, wherein the axle extends outwardly from, and defines a rotational axis of, the wheel;

a wheel mounting block associated with the housing, the block defining a plurality of bores vertically spaced-apart from one another, each bore configured to selectively receive the wheel axle to place the wheel assembly at a corresponding plurality of vertical locations relative to the housing, the block further defining a passageway extending through the block and intersecting each of the plurality of bores; and a plate retained within the passageway, the plate defining a plurality of elongate cutouts formed through the plate such that a separate elongate cutout is positioned adjacent each bore of the plurality of bores, wherein the plate is translatable within the passageway between a disengaged position, where each cutout is selectively positioned relative to its respective bore to allow longitudinal movement of the axle within the bore, and an engaged position, where a portion of the plate surrounding each cutout is selectively positioned to engage the axle to prevent longitudinal movement of the axle relative to the respective bore, the plate being defined by two planar faces and each of the plurality of elongate cutouts passing completely through the two planar faces of the plate.

* * * * *

UNITED STATES PATENT AND TRADEMARK OFFICE
CERTIFICATE OF CORRECTION

| | | |
|---|---|---|
| PATENT NO. | : 7,958,943 B2 | Page 1 of 1 |
| APPLICATION NO. | : 12/571790 | |
| DATED | : June 14, 2011 | |
| INVENTOR(S) | : Tommy Joe Vachal | |

It is certified that error appears in the above-identified patent and that said Letters Patent is hereby corrected as shown below:

At column 4, line 21, delete "culling" and insert -- cutting --;

At column 4, line 35, delete "MBA" and insert -- MHA --;

At column 6, line 14, delete "MBA" and insert -- MHA --.

Signed and Sealed this
Twenty-second Day of November, 2011

David J. Kappos
*Director of the United States Patent and Trademark Office*